(12) United States Patent
Raichle et al.

(10) Patent No.: US 7,415,351 B2
(45) Date of Patent: Aug. 19, 2008

(54) METHOD AND DEVICE FOR DETECTING AN ANGULAR POSITION SIGNAL FOR AN INTERNAL-COMBUSTION ENGINE

(75) Inventors: Franz Raichle, Korntal-Muenchingen (DE); Wolfgang Fischer, Gerlingen (DE); Joerg Breuninger, Hemmingen (DE); Haris Hamedovic, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 398 days.

(21) Appl. No.: 10/548,549

(22) PCT Filed: Mar. 1, 2005

(86) PCT No.: PCT/DE2005/050862

§ 371 (c)(1),
(2), (4) Date: Sep. 8, 2005

(65) Prior Publication Data
US 2006/0259229 A1   Nov. 16, 2006

(30) Foreign Application Priority Data
Mar. 1, 2004   (DE)   .................. 10 2004 010 441

(51) Int. Cl.
G01M 15/05  (2006.01)
(52) U.S. Cl. .................. 701/114; 73/116; 701/107
(58) Field of Classification Search ............... 701/107, 701/110, 114; 73/115, 116, 117; 123/435, 123/436
See application file for complete search history.

(56) References Cited

U.S. PATENT DOCUMENTS

| | | | |
|---|---|---|---|
| 5,499,607 A * | 3/1996 | Tomisawa | ................ 123/435 |
| 5,611,311 A | 3/1997 | Tomisawa | |
| 6,654,680 B2 * | 11/2003 | Shimada et al. | ............. 701/114 |

FOREIGN PATENT DOCUMENTS

| | | |
|---|---|---|
| DE | 197 33 958 | 2/1999 |
| DE | 101 07 892 A1 | 9/2001 |
| DE | 100 17 107 A1 | 10/2001 |
| DE | 101 13 194 | 9/2002 |
| JP | 03047471 | 2/1991 |
| JP | 06033822 | 2/1994 |
| JP | 6-217069 | 8/1994 |
| JP | 2001-263153 | 9/2001 |
| WO | 01/77692 | 10/2001 |
| WO | 03/062620 | 7/2003 |

* cited by examiner

*Primary Examiner*—Willis R. Wolfe, Jr.
*Assistant Examiner*—Johnny H. Hoang
(74) *Attorney, Agent, or Firm*—Michael J. Striker (57) ABSTRACT

The present invention relates to a method for detecting an angular position signal representing the rotary motion of a rotating part of an internal-combustion engine. The internal-combustion engine includes at least one combustion chamber. In addition, a speed sensor of the type mentioned initially is provided, the speed sensor outputting a rotation-measurement signal representing the rotary motion of a sensing wheel connected with the rotating part. At least one pressure sensor is also provided that outputs a pressure signal representing the pressure in a combustion chamber. The method according to the present invention has the following steps: Detect the pressure signal, detect the rotation-measurement signal, calculate a correction quantity that is a function, at the least, of the detected pressure signal and rotation-measurement signal, and determine the angular position signal by linking the detected rotation-measurement signal with the correction quantity. The core of the present invention is the identification and very good compensation of the sensing wheel error by performing a joint evaluation of the rotational-speed signal and the compression chamber pressure of one or more indicated cylinders.

11 Claims, 6 Drawing Sheets

METHOD AND DEVICE FOR DETECTING AN ANGULAR POSITION SIGNAL FOR AN INTERNAL-COMBUSTION ENGINE

CROSS-REFERENCE

The invention described and claimed hereinbelow is also described in PCT/DE2005/050862, filed on Mar. 1, 2005 and DE 102004010441.7, filed Mar. 1, 2004. This German Patent Application, whose subject matter is incorporated here by reference, provides the basis for a claim of priority of invention under 35 U.S.C. 119 (a)-(d).

BACKGROUND OF THE INVENTION

The present invention relates to a method and a device for detecting an engine speed signal.

With modern internal-combustion engines, the rotational-speed signal delivers information of key importance to engine management, diagnosis and optimization with regard for various criteria. According to the related art, engine speed is measured with the aid of a sensing wheel mounted on the crankshaft, the sensing wheel having a certain number of markings. The individual markings or increments are detected by a sensor.

The sensing wheels typically have tolerance-related geometric errors and installation faults. These faults cause a systematic error that substantially degrades the continued use of the rotational-speed signal and, in some circumstances, even renders it unusable for certain functionalities. It is therefore crucial that these faults be identified and compensated for.

A number of methods are known in this context:

A method is known from DE 100 17 107 A1 with which the sensing wheel errors—except for the frequency components of the main orders of the engine—can be compensated for. The method is based on the fact that the rotational non-uniformity of the internal-combustion engine only has the frequency components mentioned previously. They are estimated and removed from the rotational-speed signal. The remaining fluctuations are attributed to the effects of the sensing wheel errors.

In DE 197 33 958 A1 and WO 01/77692, a segment-based correction of the rotational-speed signal is carried out with low angular resolution.

In DE 101 07 892 A1, the rotational non-uniformities are estimated, using models, based on the intake-manifold pressure, ambient pressure, engine geometry and control times, and they are used, together with the measured rotational-speed signal, to calculate the individual sensing wheel errors.

The method described in WO 03/062620 assumes that the moments of inertia and engine gas acting on the shaft cancel each other out statistically, at least to a great extent, when the averaging process is carried out within a certain rotational speed range. Based on the mean profile of angular speed calculated in this manner, the geometric errors of the sensing wheel are identified.

With modern systems for gasoline and diesel engines, access to the fuel and air path is enabled on a cylinder-specific basis. To fully utilize the potential available to reduce fuel consumption and emissions, the engine management system must receive feedback on the processes that are actually taking place in the combustion chamber. The course of pressure in the combustion chamber over time is a key quantity used to realize functionalities of cylinder-specific engine management and control. Even when a series-production combustion chamber pressure sensor does become available, it is not always possible to indicate all cylinders in an engine, due to reasons of cost and limitations on installation space.

SUMMARY OF THE INVENTION

The present invention relates to a method for detecting an angular position signal that represents the rotary motion of a rotating part of an internal-combustion engine. The internal-combustion engine has at least one combustion chamber. A speed sensor of the type mentioned initially is also provided, the speed sensor outputting a rotation-measurement signal that represents the rotary motion of a sensing wheel connected with the rotating part. At least one pressure sensor is also provided that outputs a pressure signal that represents the pressure in a combustion chamber. The method according to the present invention has the following steps:

Detect the pressure signal.
Detect the rotation-measurement signal.
Calculate a correction quantity that is a function, at the least, of the detected pressure signal and rotation-measurement signal.
Determine the angular position signal by linking the detected rotation-measurement signal with the correction quantity.

The core of the present invention is the identification of and compensation for the sensing wheel error by performing a joint evaluation of the rotational-speed signal and the compression chamber pressure of one or more indicated cylinders. Advantageously, sensing wheel errors of any engine orders can be compensated for with very high accuracy and reliability. The errors of every individual increment are identified. Measuring the combustion chamber pressure in one or more cylinders makes it possible to very accurately model the combustion-relevant rotational non-uniformities, therefore resulting in a gain based on the accuracy of the identification.

In an advantageous embodiment of the present invention, it is provided that the correction quantity is calculated as a function, at the least, of the simultaneously-detected pressure signal and rotation-measurement signal.

It can be further provided that the pressure signal is detected at least during a specifiable operating state of the internal-combustion engine, and that the correction quantity is calculated as a function, at the least, of the pressure signal and rotation-measurement signal detected during a specifiable operating state of the internal-combustion engine. It is particularly advantageous that the specifiable operating state is a steady-state trailing throttle operating state of the internal-combustion engine.

It can also be provided that the specifiable operating state is one in which disturbances of a certain magnitude, such as travelling across a bumpy road or strong spurious oscillations, do not occur.

The limitation of specifiable operating states such as the steady-state trailing throttle operating state of the internal-combustion engine can be eliminated when correction quantities calculated based on a specifiable number—an adequately large number in particular—of combustion processes are combined to form a resultant correction quantity, in particular by calculating the mean. The angular position signal is then determined by linking the detected rotation-measurement signal with the resultant correction quantity.

In a particularly advantageous embodiment of the present invention, it is provided that the internal-combustion engine has at least two combustion chambers, at least one of the which does not have a pressure sensor. It is particularly advantageous that only one pressure sensor is provided to detect the pressure in a "lead cylinder".

In another particularly advantageous embodiment of the present invention, it is provided that the internal-combustion engine has at least three combustion chambers, at least one of which does not have a pressure sensor. In particular, only two pressure sensors should be provided in the combustion chambers, the combustion chambers with the pressure sensors being selected such that the combustion processes take place in succession in these combustion chambers.

In an advantageous embodiment, it is provided that the correction quantity is still calculated as a function of the load being applied to the internal-combustion engine during the detection process, and/or as a function of the rotational speed of the internal-combustion engine that exists during the detection process.

In addition to the method, the present invention also relates to the device for carrying out the method according to the present invention.

Further embodiments are described in the subclaims.

BRIEF DESCRIPTION OF THE DRAWINGS

FIG. 6 shows the correlation between the estimated, cylinder-specific, indicated mean pressure Pmi and the reference of measured pressure.

DETAILED DESCRIPTION OF THE EXEMPLARY EMBODIMENT

The present invention is explained as an example in the exemplary embodiments below.

As mentioned initially, modern systems for gasoline and diesel engines enable access to the fuel and air path on a cylinder-specific basis. To fully utilize the potential available to reduce fuel consumption and emissions, the engine management system must receive feedback on the processes that are actually taking place in the combustion chamber. The course of pressure in the combustion chamber over time is a key quantity used to realize functionalities of cylinder-specific engine management and control. Even when a series-production combustion chamber pressure sensor does become available, it is not always possible to indicate all cylinders in an engine, due to reasons of cost and limitations on installation space. The present invention was preceded by tests carried out to determine whether the desired combustion-relevant pressure features could be ascertained with the required level of accuracy by using a reduced number of pressure sensors—with only one indicated lead cylinder, in the best case—and by using available rotational-speed information.

A method for compensating for sensing wheel errors by performing a joint evaluation of the rotational-speed signal and combustion chamber pressure in a lead cylinder will be presented below. Based on the results of this compensation, a method will be described below that enables reconstruction of the cylinder-specific, indicated mean pressure Pmi of each individual combustion process. Finally, the results will be presented and discussed with reference to measured data.

Cylinder-specific Pmi values can be used for control, management, monitoring and/or diagnosis, and are one of the key characteristics of combustion chamber pressure.

1. Measuring Rotational Speed

Rotational speed is measured based on the principle of measuring period duration using a 60-2 sensing wheel mounted on the crankshaft. This means the sensor has 58 teeth distributed around the circumference of the wheel such that, if 60 teeth were distributed evenly around the circumference, two of them would be missing. The two missing teeth make it possible to determine the absolute position of the sensing wheel, that is, the "reference point".

The individual teeth are scanned by a speed sensor 11, thereby permitting detection of the time $t_i$ between the pulses of two consecutive teeth on the sensing wheel. This results in the following equation for the mean angular velocity of the interval under consideration when a sensing wheel with n teeth is used:

$$\overset{*}{\varphi}_i \approx \frac{2\pi}{n \cdot t_i} \quad (1)$$

With regard for the lead cylinder attachment, the primary evaluation is that of the fluctuations of the rotational-speed signal. The amplitude of these fluctuations is typically only a few percent of the steady component. For this reason, the requirements for the accuracy of signal detection are extremely high.

The main interference is caused by tolerance-related geometric errors and installation faults associated with the sensing wheel. Depending on the particular engine, tolerance limits of between 0.1 and 0.3° crankshaft angle per width of tooth face are specified; this corresponds to a percentage of 1.67% and 5%. A sensing wheel error $\Delta\varphi_i$ affects the measurement of the tooth time as follows:

$$t_{mess,i} = \frac{2\pi/n + \Delta\varphi_i}{\overset{*}{\varphi}_i} \quad (2)$$

Based on this, the angular velocity $\overset{*}{\varphi}_{mess,i}$ is calculated, without knowledge of the tooth error, whereby the following applies:

$$\overset{*}{\varphi}_{mess,i} = \frac{2\pi}{n \cdot t_{mess,i}} \quad (3)$$

Figure 2:
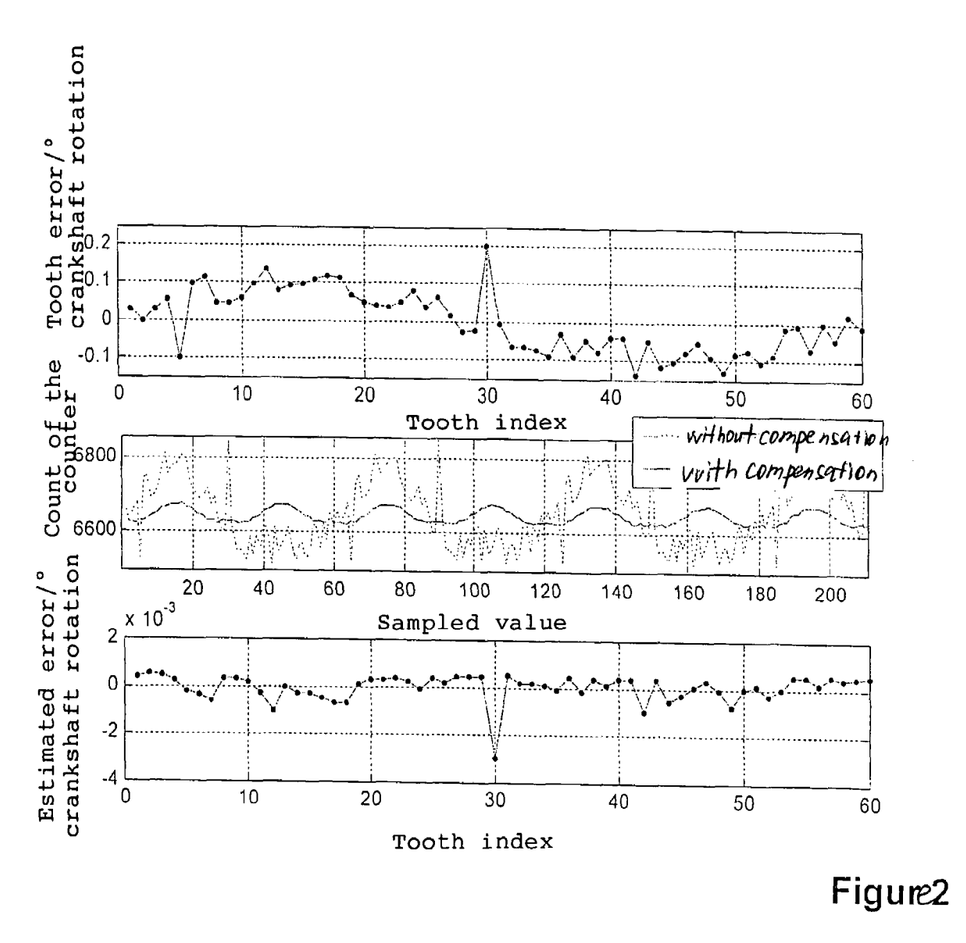

The sensing wheel errors $\Delta\varphi_i$ therefore create a systematic error that substantially degrades the quality of the processing of the rotational-speed signal or even renders it unusable under certain conditions. This is described with reference to FIG. 2. The identification and effect of the sensing wheel errors are depicted in FIG. 2. The suppression of this influencing quantity is an essential precondition for successfully evaluating the rotational-speed data.

In the top and bottom graphs in FIG. 2, the sensing wheel error (top graph) and the estimated error (bottom graph) are plotted against the tooth index. The middle graph in FIG. 2 shows the count of the counter with and without compensation, as a function of the sampled value.

2. Compensation of the Sensing Wheel Error

The energy of the crankshaft assembly is composed of the kinetic energy and potential energy. The latter can be disregarded for the engines under consideration. Based on this assumption, the energy E at the crankshaft can be calculated as follows:

$$E(\varphi) = E_{Kin}(\varphi) + E_{Poi}(\varphi) \approx \frac{1}{2} \cdot \Theta(\varphi) \cdot \overset{*}{\varphi}^2 \qquad (4)$$

where $\Theta$ ($\phi$) is the moment of inertia of the engine as a function of crankshaft angle. The measured rotational-speed signal $t_{mess,i}$ is corrupted by the sensing wheel error, however. As a result, the following applies, in the angle-discrete case, for the calculated energy (referred to below as $E_{mess}$):

$$E_{mess,i} = \frac{1}{2} \cdot \Theta_i \cdot \overset{*}{\varphi}^2_{mess,i} \qquad (5)$$

Figure 1:
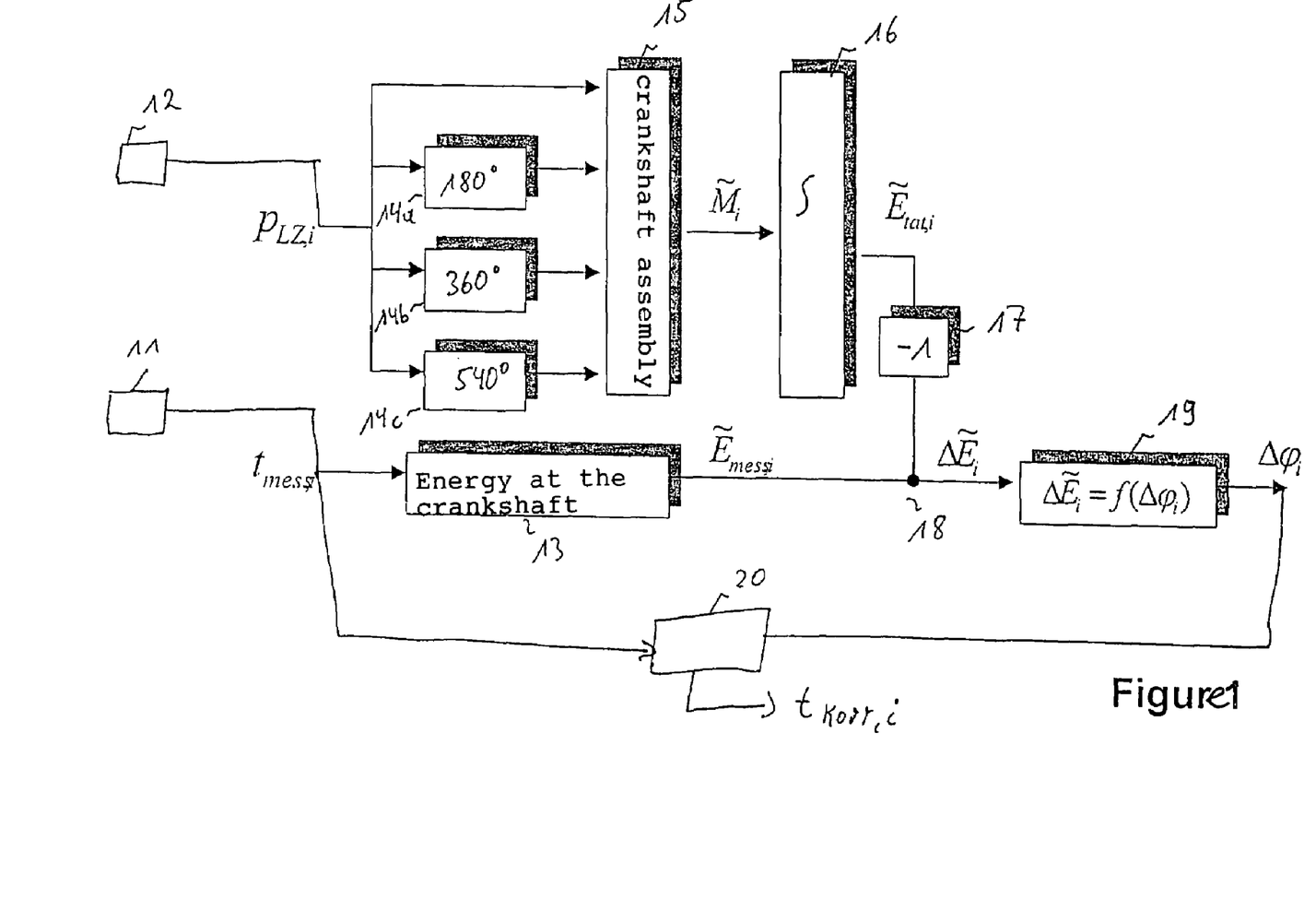
FIG. 1 illustrates the process of identifying sensing wheel errors according to an exemplary embodiment, in the form of a block diagram. The identification and effect of the sensing wheel errors are depicted in FIG. 2. The gas torques are depicted in FIG. 3.

$E_{mess}$ is determined in block 13 in FIG. 1. Individual sensing wheel errors therefore have a direct effect on the fluctuations of $E_{mess}$, as described by equations (2-4). The course of the actual energy, $E_{tat}$, over time as a function of crankshaft angle is determined physically by the combustion chamber pressure in the individual cylinders. With the present method, it is assumed that the alternating components of the friction at the operating point considered to identify the sensing wheel error are negligibly small, that the crankshaft is sufficiently rigid, and that no torsional oscillations are stimulated at the operating point used to identify the sensing wheel error. Under these conditions, the following applies:

$$\frac{dE}{d\varphi} = M_{Gas} - M_{Nutz} - M_{Reib} = \tilde{M}_{Gas} + \overline{M}_{Gas} - M_{Nutz} - M_{Reib} \qquad (6)$$

where the total gas torque $M_{Gas}$ is composed of the mean $\overline{M}_{Gas}$ and the alternating component $\tilde{M}_{Gas}$. The resultant moment is therefore composed of the gas torque, useful torque, and moment of friction. In steady-state operation, the angular velocity of the crankshaft remains constant.

The following therefore applies for the mean torque and the alternating components of the energy:

$$\overline{M} = \overline{M}_{Gas} - M_{Nutz} - M_{Reib} = 0 \qquad (7)$$

$$\tilde{E} = \int \tilde{M}_{Gas} \cdot d\phi \qquad (8, \text{Block } 16)$$

The gas torque is calculated as follows:

$$M_{Gas} = \sum_{k=1}^{z} (P_k(\varphi_k) - P_0) \cdot A \cdot$$

$$\left( \sin\varphi_k + \frac{\lambda \cdot \sin\varphi_k \cdot \cos\varphi_k - \mu \cdot \cos\varphi_k}{\sqrt{1 - \lambda^2 \cdot \sin^2\varphi_k + 2 \cdot \lambda \cdot \mu \cdot \sin\varphi_k - \mu^2}} \right) \cdot r, \qquad (9, \text{Block } 15)$$

where z is the number of cylinders, $P_k(\phi_k)$ is cylinder pressure, $\phi_k$ is the crank angle based on the cylinder k according to the ignition sequence, $P_0$ is ambient pressure, A is the surface area of the piston, $\lambda$ stroke/connecting rod ratio, $\mu$ is the offset ratio, and r is the piston radius. When the course of pressure in all cylinders over time is known, it is therefore possible to calculate a reference for the alternating components of the energy $E_{tat}$ using the model of the crankshaft assembly (block 15). The offset ratio $\mu$ is defined as the quotient of offset/connecting rod length. The offset is the distance between the axis of rotation of the crankshaft and the line along which the piston moves.

Provided that the compression ratios and charge of the individual cylinders are nearly identical, it can be assumed—for steady-state trailing throttle operation—that all cylinders have the same combustion chamber pressure, although each is phase-shifted by a defined crankshaft angle (blocks 14a, 14b and 14c). It is therefore possible to calculate, for this operating point, the course of energy over time at the crankshaft with the aid of the lead cylinder. As shown in FIG. 1, the individual tooth errors can be calculated by solving equation (10) as a function of $\Delta\phi_i$.

$$\tilde{E}_{mess,i} - \tilde{E}_{tat,i} = f(\Delta\phi_i) \qquad (10, \text{Blocks } 17, 18 \text{ and } 19)$$

where $f(\Delta\phi_i)$ is obtained from equations (1-5). To minimize the effects of stochastic interferences, it is advisable to calculate the mean of a larger number of cycles.

If the sensing wheel errors were already identified once and stored in memory (part of block 20), they can be used during on-going operation to perform a compensation, as follows:

$$t_{korr,i} = t_{mess,i} \cdot \frac{2\pi / n}{2\pi / n + \Delta\varphi_i} \qquad (11, \text{Block } 20)$$

An example of identifying the tooth errors is shown in FIG. 2 using a simulated tooth error and measured data.

3. Estimating the Cylinder-Specific Mean Pressure:

The calculations performed in section 2 are based on an operating point in which the alternating components of friction were assumed to be minimal or negligible. In the examples provided below, no limits are placed on the working point under consideration. The alternating components of friction must therefore be taken into account. It is also assumed that the crankshaft is adequately rigid.

Based on the rotational-speed signal—from which sensing wheel errors have been eliminated—the torque applied at the crankshaft can be calculated using equations (4) and (6):

$$\frac{dE}{d\varphi} = \qquad (12)$$

$$\Theta \cdot \frac{d\overset{*}{\varphi}}{d\varphi} \cdot \overset{*}{\varphi} + \frac{1}{2} \frac{d\Theta}{d\varphi} \cdot \overset{*}{\varphi}^2 = \tilde{M}_{Gas} + \overline{M}_{Gas} - M_{Nutz} - M_{Reib} - \tilde{M}_{Reib}$$

The torque profiles can also be considered to be adequately steady during dynamic operation. Equation (7) therefore yields:

$$\tilde{M}_{Gas} = \Theta \cdot \frac{d\overset{*}{\varphi}}{d\varphi} \cdot \overset{*}{\varphi} + \frac{1}{2} \frac{d\Theta}{d\varphi} \cdot \overset{*}{\varphi}^2 + \tilde{M}_{Reib} \qquad (13)$$

The moment of friction can be calculated with the aid of model-based approaches, using exact engine parameters.

Another approach for compensating for the alternating components of friction is made possible by the lead cylinder attachment. Similar to the identification of sensing wheel errors, components that are dependent on rotational speed can be determined during trailing-throttle operation at different rotational speeds by comparing the gas torque profiles calculated based on rotational speed and those calculated based on combustion chamber pressure. In addition, during ongoing operation and based on the indication of the lead cylinder, the total gas torque can be estimated with a high degree of accuracy for the duration of the high-pressure phase of the lead cylinder. It is therefore possible to adaptively adjust the friction profiles obtained in the trailing-throttle operating state to the particular load.

After performing this compensation, one arrives at a very exact estimate of the alternating components of total gas torque.

Figure 3:
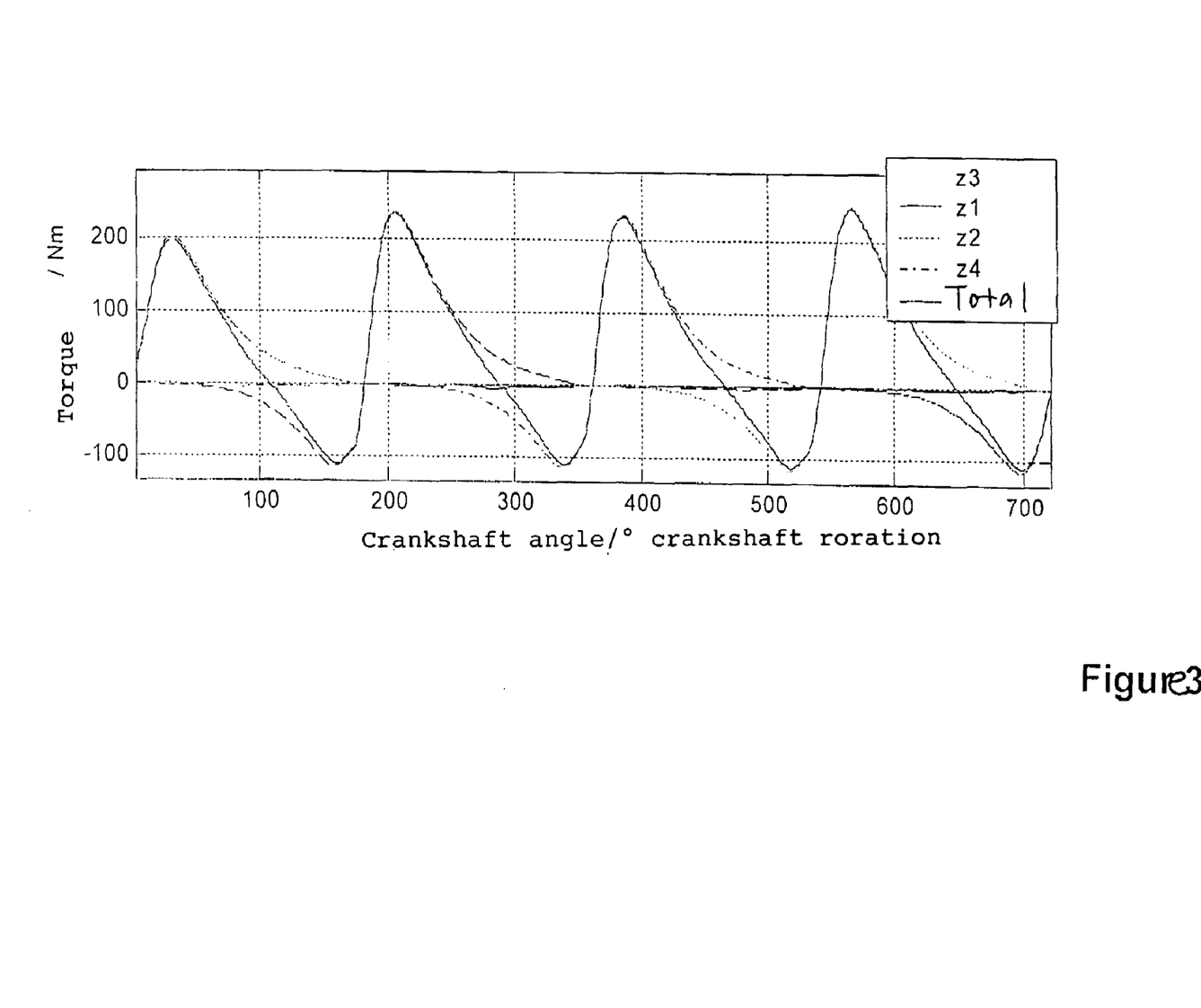

In FIG. 3, the gas torques of the individual cylinders (cylinders Z1, Z2, Z3, Z4 and the total) for one operational cycle are shown superimposed on one another, as an example. Knowing the combustion chamber pressure in the lead cylinder makes it possible to single out the gas torques of individual cylinders using the model of the crankshaft assembly. As a result, the indicated mean pressure can be estimated for each individual cylinder.

The indicated mean pressure is a measure of the work performed by the particular cylinder per piston displacement V, and is defined as follows:

$$Pmi = \frac{1}{V} \cdot \int_{AS} p(\varphi) \cdot dV = \frac{1}{V} \cdot \int_{AS} M_{Gas}(\varphi) \cdot d\varphi, \quad (14)$$

where the integration limits are the crankshaft angle range of one operational cycle.

Figure 4:
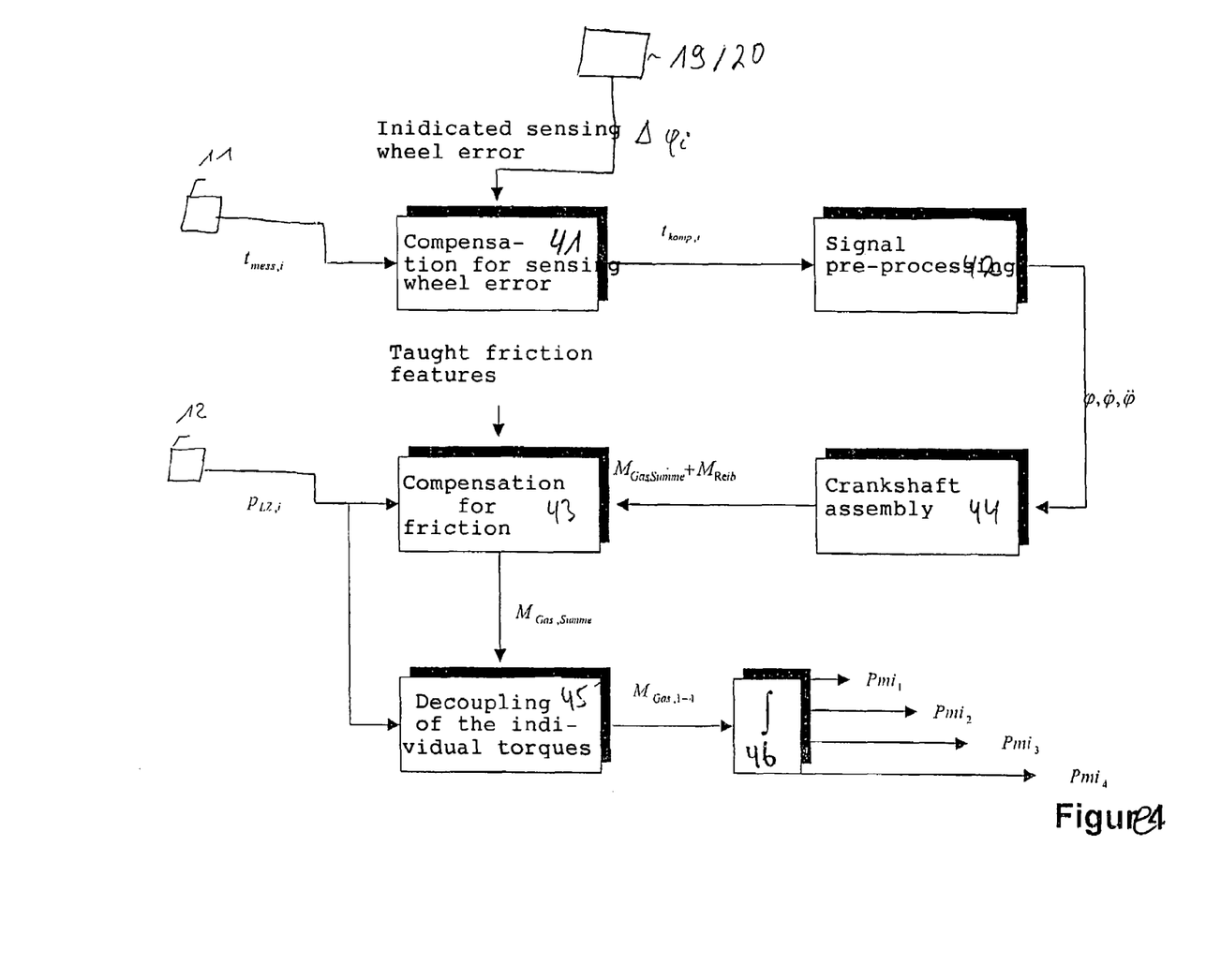
FIG. 4 shows the principle of estimating the cylinder-specific, indicated mean pressure.

FIG. 4 shows the principle of estimating the cylinder-specific, indicated mean pressure.

The individual teeth are scanned by a speed sensor 11, and the time $t_{mess,i}$ between the pulses of two consecutive teeth on the sensing wheel is thereby detected. Compensation of the sensing wheel errors is carried out in block 41. The sensing wheel errors that were already identified and stored (block 19/20 in FIG. 1) are taken into account.

In block 42, the time signal $t_{koor,i} = t_{komp,i}$ corrected in this manner is converted to angular signals and forwarded to block 44. There, as described with reference to block 15, the total gas torque and the moment of friction are calculated and forwarded to block 43.

In block 43, the total gas torque is determined with consideration for friction. To do this, combustion chamber-pressure signals $p_{LZ,i}$ detected by pressure sensor 12 are linked with the "taught friction features". The "taught friction features" are calculated in advance according to a method known from the literature (refer to: Rezeka, S. F., Henein, N. A.: A New Approach to Evaluate Instantaneous Friction and Its Components in Internal-combustion engines, SAE Technical Paper Series, No. 840179, 1984) based on the engine dimensions, and are stored in a memory.

In block 45, the individual moments are decoupled, thereby yielding the gas torques $M_{Gas,1-4}$ of the individual cylinders.

By performing integration 46, the cylinder-specific $P_{mi}$ values are obtained.

Figure 5:
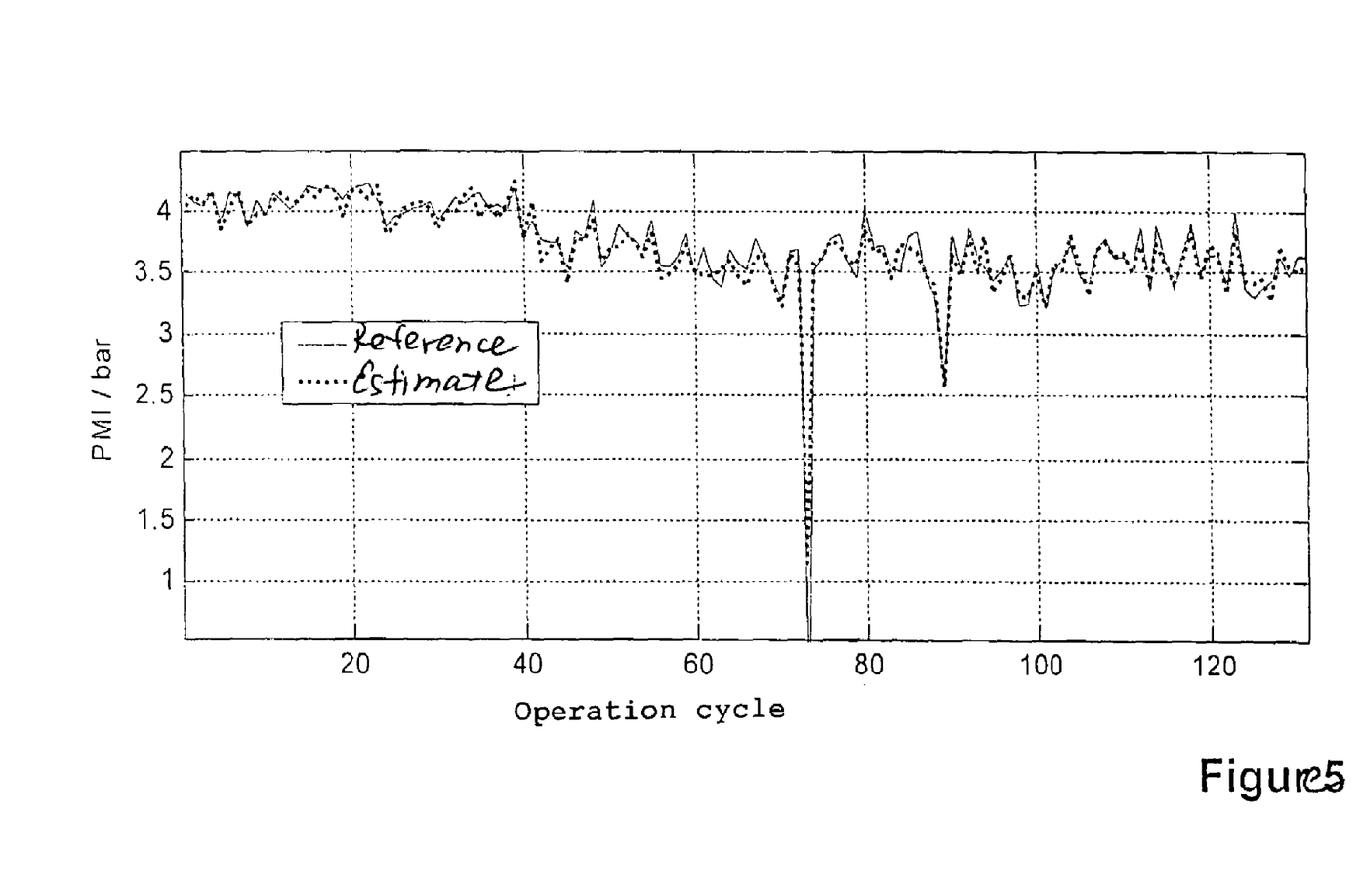
FIG. 5 illustrates the estimation of the cylinder-specific, indicated mean pressure of individual combustion events in a cylinder at 3000 revolutions per minute.

The method presented was verified in measurements carried out with two fully-indicated gasoline engines. The indicated mean pressure calculated from the measured combustion chamber pressure was used as the reference. The results obtained from a four-cylinder, gasoline direct-injection engine with a piston displacement of 1.4 liters are shown in FIGS. 5 and 6. FIG. 6 shows the correlation of the estimate with the reference for various rotational speeds, where σ is the particular standard deviation and m is the mean estimation error. A total of approximately 96 000 combustion events were used to calculate the statistics. The values for the lead cylinder were not included, since they are already known via the indication.

The combination of the two methods presented for compensating for the sensing wheel errors and estimating the cylinder-specific mean pressure provide feedback from the combustion chamber of every single cylinder. In doing so, a single pressure sensor and the already-available rotational-speed signal are used. By jointly evaluating these signals with the aid of the algorithms presented, new possibilities are created for carrying out cost-effective, cylinder-specific engine management and control, and for improving existing functionalities.

What is claimed is:

1. A method for determining an angular position signal ($\phi_i$) representing a rotary motion of a rotating part of an internal-combustion engine with a speed sensor (11) that outputs a rotation-measurement signal ($\phi_{mess,i}$, $t_{mess,i}$) representing the rotary motion of a sensing wheel connected to the rotating part, and at least one pressure sensor (12) that outputs a pressure signal ($P_{Lz,i}$) representing a pressure in a combustion chamber, having the following steps:
   detecting the pressure signal ($P_{Lz,i}$),
   detecting the rotation-measurement signal ($\phi_{mess,i}$, $t_{mess,i}$),
   calculating a correction quantity ($\Delta\phi_i$) that is a function, at the least, of the detected pressure signal and rotation-measurement signal,
   determining the angular position signal ($\phi_i$) by linking the detected rotation-measurement signal ($\phi_{mess,i}$, $t_{mess,i}$) with the correction quantity ($\Delta\phi_i$),
   determining a first energy value ($E_{mess,i}$) representing an energy of the crankshaft assembly from the rotation-measurement signal ($\phi_{mess,i}$, $t_{mess,i}$),
   determining a second energy value ($E_{tat,i}$) representing the energy of the crankshaft assembly from the pressure signal ($P_{LZ,i}$), and
   calculating the correction quantity ($\Delta\phi_i$) as a function of the first and second energy values, wherein the correction quantity ($\Delta\phi_i$) is calculated as a function of the difference between the first and second energy values.

2. The method as recited in claim 1, wherein the correction quantity ($\Delta\phi_i$) is calculated as a function, at the least, of a simultaneously-detected pressure signal ($P_{Lz,i}$) and rotation-measurement signal ($\phi_{mess,i}$, $t_{mess,i}$).

3. The method as recited in claim 1, wherein the pressure signal ($P_{Lz,i}$) is detected at least during a specifiable operating state of the internal-combustion engine, and the correction quantity ($\Delta\phi_i$) is calculated as the function, at the least, of the pressure signal ($P_{Lz,i}$) and rotation-measurement signal ($\phi_{mess,i}$, $t_{mess,i}$) detected during a specifiable operating state of the internal-combustion engine.

4. The method as recited in claim 1, wherein a specifiable operating state is a steady-state trailing throttle operating state of the internal-combustion engine.

5. The method as recited in claim 1, wherein a specifiable operating state is an operating state during which disturbances of a certain magnitude, such as travelling across a bumpy road or strong spurious oscillations, do not occur.

6. The method as recited in claim 1, wherein the correction quantities calculated based on a specifiable number of combustion processes are combined to form a resultant correction quantity by calculating the mean, and the angular position signal ($\phi_i$) is calculated by linking the detected rotation-measurement signal ($\phi_{mess,i}$, $t_{mess,i}$) with the resultant correction quantity.

7. The method as recited in claim 1, wherein the internal-combustion engine has at least two combustion chambers, at least one of which does not have the pressure sensor, and, only one pressure sensor being provided.

8. The method as recited in claim 1, wherein the internal-combustion engine has at least three combustion chambers, at least one of which does not have the pressure sensor, and, only two pressure sensors being provided in the combustion chambers in which the combustion processes take place in succession.

9. The method as recited in claim 1, wherein the correction quantity is still calculated as a function of a load applied to the internal-combustion engine during the detection process, and/or as a function of the rotational speed of the internal-combustion engine that exists during the detection process.

10. The method as recited in claim 1, wherein the correction quantity ($\Delta\phi_i$) is stored in a memory (20), and the angular position signal ($\phi_i$) is calculated by linking the detected rotation-measurement signal ($\phi_{mess,i}$, $t_{mess,i}$) with the correction quantity ($\Delta\phi_i$) while the internal-combustion engine is running.

11. A device for carrying out a method for determining an angular position signal ($\phi_i$) representing a rotary motion of a rotating part of an internal-combustion engine with a speed sensor (11) that outputs a rotation-measurement signal ($\phi_{mess,i}$, $t_{mess,i}$) representing the rotary motion of a sensing wheel connected to the rotating part, and at least one pressure sensor (12) that outputs a pressure signal ($P_{LZ,i}$) representing a pressure in a combustion chamber, having the following steps:

detecting the pressure signal ($P_{LZ,i}$).
  detecting the rotation-measurement signal ($\phi_{mess,i}$, $t_{mess,i}$),
  calculating a correction quantity ($\Delta\phi_i$) that is a function, at the least, of the detected pressure signal and rotation-measurement signal,
  determining the angular position signal ($\phi_i$) by linking the detected rotation-measurement signal ($\phi_{mess,i}$, $t_{mess,i}$) with the correction quantity ($\Delta\phi_i$),
  determining a first energy value ($E_{mess,i}$) representing an energy of the crankshaft assembly from the rotation-measurement signal ($\phi_{mess,i}$, $t_{mess,i}$),
  determining a second energy value ($E_{tat,i}$) representing the energy of the crankshaft assembly from the pressure signal ($P_{LZ,i}$), and
  calculating the correction quantity ($\Delta\phi_i$) as a function of the first and second energy values, wherein the correction quantity ($\Delta\phi_i$) is calculated as a function of the difference between the first and second energy values.

* * * * *